I. M. SCHWAB.
SPECTACLE TEMPLE.
APPLICATION FILED SEPT. 13, 1919.
1,337,330.
Patented Apr. 20, 1920.
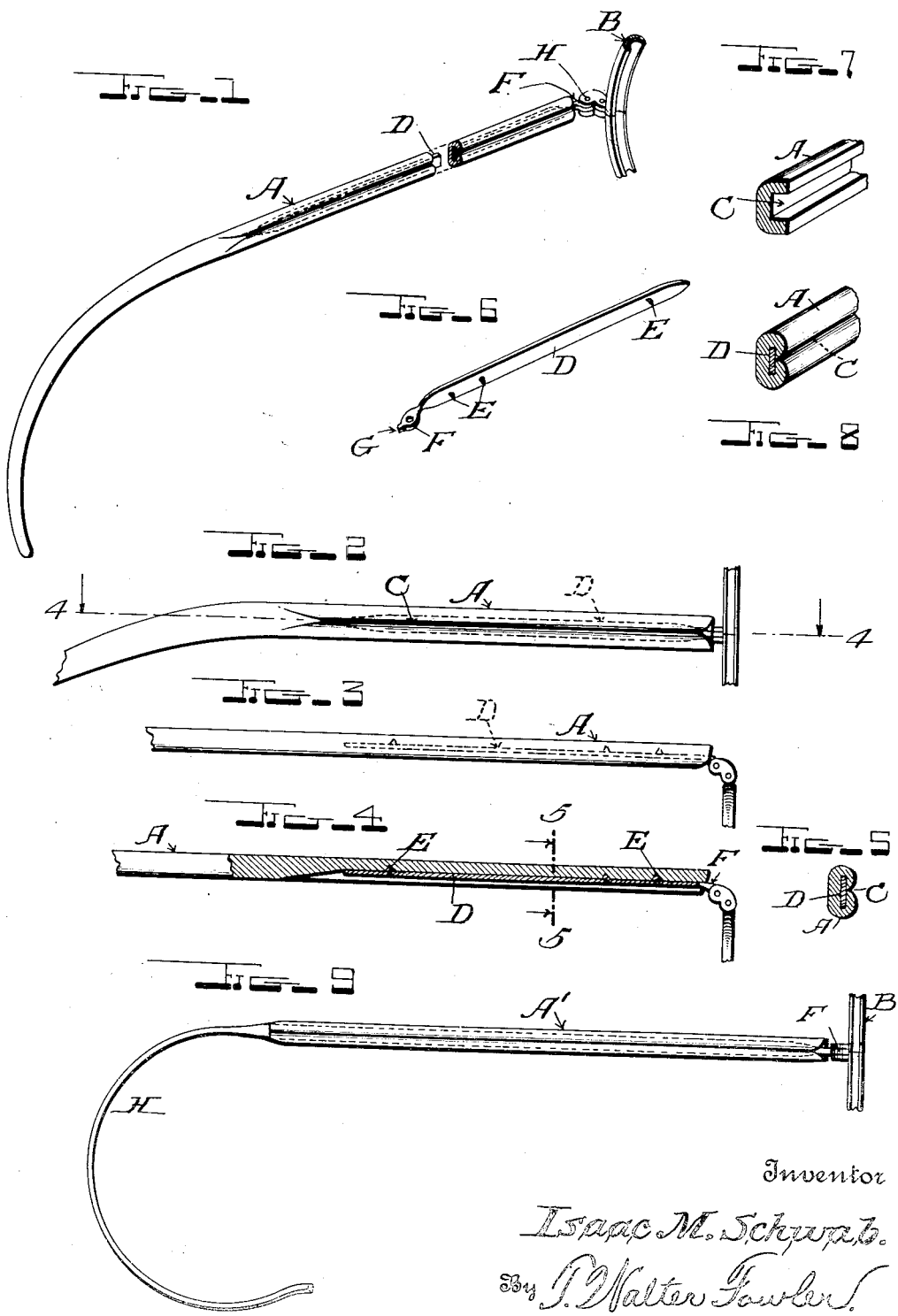

UNITED STATES PATENT OFFICE.

ISAAC M. SCHWAB, OF SAVANNAH, GEORGIA.

SPECTACLE-TEMPLE.

1,337,330.  Specification of Letters Patent.  Patented Apr. 20, 1920.

Application filed September 13, 1919. Serial No. 323,559.

*To all whom it may concern:*

Be it known that I, ISAAC M. SCHWAB, a citizen of the United States, residing at Savannah, in the county of Chatham and State of Georgia, have invented certain new and useful Improvements in Spectacle-Temples, of which the following is a specification.

My invention relates to certain new and useful improvements in temples or members for retaining ophthalmic mountings on the face and has particular reference to an improvement in temples wherein a part of the same is formed from metal and a part from shell, xylonite or similar non-metallic material.

A leading object of the present invention is to construct a temple composed of shell, xylonite or other non-metallic material with a concealed metallic reinforcement which is permanently secured in place and extends for a substantial length along the temple to strengthen the same and to allow for adjustments and to impart increased resiliency to said temple, said metallic reinforce serving to protect the non-metallic portion of the temple from warping and insuring its being maintained in a true position.

With the above and other objects in view, my invention consists of the parts and the constructions, arrangements and combinations of parts forming the improved temple which I will hereinafter describe and claim.

In the accompanying drawings forming part of this specification and in which similar reference characters indicate like parts in the several views, Figure 1 is a perspective view showing my improved temple attached to a fragment of a rim of a spectacle.

Fig. 2 is a side elevation looking toward the inside of the temple of Fig. 1.

Fig. 3 is a top plan view of Fig. 2.

Fig. 4 is a longitudinal sectional view on the line 4—4 of Fig. 2.

Fig. 5 is a cross sectional view on the line 5—5 of Fig. 4.

Fig. 6 is a perspective view of the metal reinforce detached.

Fig. 7 illustrates a sectional perspective view of a fragment of the temple showing the groove or recess first made for the reception of the metal reinforce.

Fig. 8 is a similar view showing the non-metallic portion of the temple turned over to embed and conceal the metal reinforce.

Fig. 9 is a side elevation looking toward the inside of a temple showing the metal reinforce continued to form a resilient loop or ear-piece.

While my invention is capable of use with different styles and designs of temples, I have shown as an embodiment of the invention a temple, A, such as is now extensively worn and which is usually composed of shell, xylonite, or similar non-metallic material, and which is molded into form and, in the design of temple shown in Fig. 1, is extended rearwardly and has a curved outer end adapted to hook over the ear in the usual manner. Temples of the type shown are usually formed with a hinge member which co-acts with a corresponding member of the rim, B, of the spectacle, but among the recognized objections to such temples as before referred to, is the fact that they have a tendency to warp so that they are not retained on the face in their true position, and being devoid of reinforcement, these present-day temples allow the spectacle rim to change its position before the eye, thereby causing discomfort to the wearer; also with the former temples it is practically impossible to change the angle of the temple to make it fit the peculiar contour of the individual face, this being true where one ear of the wearer is higher than the other, or where both ears are set higher or lower than the angle of the eye. To meet these and other objections which are incident to the xylonite and other non-metallic temples, now in common use, I have designed the present improvement, which I will now describe.

In carrying out my invention I form or provide the inner face of the xylonite or other non-metallic portion of the temple with a groove or channel, C, which may be molded, cut or otherwise formed in the material of the temple and which extends along the inner face of the same for a substantial distance. As a matter of fact the length of this groove may be substantially equal to the length of the straight portion of the usual temple. The groove I prefer to form substantially rectangular in cross section, but with one side open, as indicated in Fig. 7, said groove having preferably, a relatively flat floor or bottom, since I prefer to use in connection with the groove a flat strip of metal, which is designed to form the reinforce and to impart added resiliency and strength to the complete temple. The reinforcing member, D, is formed of material differing from that of the part which is to receive it; it is preferably made of metal in the form of a relatively thin flat strip and from one side of it will project spurs or projections, E, which may be struck from the metal or be otherwise formed and which spurs are designed to be embedded in the shell or xylonite portion of the temple, said strip having one end turned and formed to provide a hinge member, F, and stop, G, which co-act with corresponding parts on the rim of the frame, the two members being appropriately joined by a pin or pivot, H.

The metal reinforcing strip is of such width that it approximately closely fits the groove, C, formed in the xylonite or shell portion of the temple and this strip is placed into the groove and then by an appropriate tool the walls of the groove are turned inwardly upon the metal strip and seamed or pressed down upon the latter so as to inclose and conceal the same and at the same time cause the spurs or projections, E, to embed themselves in the shell or xylonite to thereby prevent endwise movement of the embedded metal plate and to insure said plate being retained accurately and immovably in position. When the shell or xylonite has been thus closed down upon the embedded metal strip, the latter is concealed at all points except at the hinged joint, and no portion of the same is visible to the eye and no metal part of the temple is exposed to injure the face of the wearer. The temple thus has the appearance of an all-shell or all-xylonite temple, a fact which adds to the appearance of the completed article.

When the spring member or reinforce has been inserted and secured as before stated, it will be found to serve as a strengthening member for the temple. It also allows for adjustment, since the metal reinforce is of a resilient character and this provides for the desirable lateral spring tension. Further, when a metal strip is embedded in the shell, xylonite, or non-metallic portion of the temple, it overcomes the known tendency of such a temple to break with even ordinary handling, and the metal piece when once inserted in its relatively rectangular seat or channel in the inner face of the temple, cannot possibly turn on its seat, but will be rigidly held; it also cannot be moved lengthwise, since such movement is resisted by the embedding of the spurs, E, in the xylonite portion of the temple. The turning over of the edges of the xylonite portion of the temple not only conceals the metal reinforce, but it prevents any portion of the metal from coming into contact with the skin; also, by using the metal reinforce I am permitted to make a temple of shell, xylonite, or other non-metallic material of less thickness than is now possible without in any manner impairing the strength and usefulness of the temple.

The reinforcing strip, D, may be used in connection with temples of different designs and of different lengths and sizes, and when the reinforce is supplied as I have described, there is no tendency of the non-metallic portion to warp or get out of true, neither can the frames change their position before the eye and thus cause discomfort to the wearer. By providing the metal piece with a hinge member and which extends slightly beyond the inner end of the non-metallic portion of the temple, the optician will be able to so bend or manipulate this extension that the temple can be angled to fit any peculiar contour of a particular face, such adjustment being necessary in those cases where the wearer has one ear higher than the other, or where both ears are set higher or lower than the angle of the eye.

Inasmuch as some wearers prefer the flexibility which is common to the wire hooks or ear pieces which are commonly associated with the spectacle temples, I have illustrated in Fig. 9, the application of my improvement to such an arrangement. In this case the shell, xylonite or other non-metallic portion, A', of the temple, is grooved on its inside as before stated and the metal reinforcing strip is seated in the groove thus formed and the edges of the grooved portion turned inward over the metal piece, to conceal the same, but the outer extremity of the reinforce is continued beyond the end of the xylonite or non-metallic part of the temple and is formed into the usual hook or ear piece, H. In either of the above described forms of my invention I am permitted to employ the shell, xylonite or other non-metallic material for the major portion of the temple, and yet I strengthen and reinforce this portion and keep it from warping and give added resiliency to it without danger of breakage, by securing within said portion the reinforcing strip before mentioned.

Having thus described my invention what I claim as new and desire to secure by Letters Patent is:—

1. A spectacle temple having a non-metallic portion normally grooved on its inner face, and a resilient flat-sided strip of differing material seated in said groove and concealed by overturning the walls thereof, said strip adapted to reinforce the non-metallic portion and impart increased resiliency thereto.

2. As an article of manufacture, a spectacle temple of non-metallic material grooved on its inner side and having a resilient metal plate seated in said grooved portion, the material of the temple being turned over to house the metal plate.

3. As an article of manufacture, a spectacle temple of non-metallic material grooved on its inner side and having a resilient metal plate seated in said grooved portion, the material of the temple being turned over to conceal and house the metal plate, and one end of said plate extending beyond the non-metallic portion of the temple and formed as a hinge member and stop.

4. A temple formed of non-metallic material having an interior channel, a resilient, flat metal strip fitting said channel and concealed from view by over-turned portions of the non-metallic part, the outer end of said metallic strip extending beyond the end of the non-metallic portion and being fashioned into a hook or ear piece, and the inner end of said metallic portion projecting beyond the corresponding end of the non-metallic member and being formed with a hinge member and stop, and means for preventing relatively endwise movement between the metallic and non-metallic portions of the temple.

5. The method herein described of forming a spectacle temple, said method consisting, essentially, in grooving or channeling the inner surface of a non-metallic part, then seating in said grooved portion a relatively flat-sided member of resilient material differing from the material of the first mentioned part, and then closing in the groove or channel by turning the walls thereof over upon the inserted metal to thereby cover and secure the latter, the inner end of the embedded piece being exposed beyond the corresponding end of the non-metallic portion and fashioned to form a hinge member and stop.

In testimony whereof I affix my signature.

ISAAC M. SCHWAB.